July 10, 1928.  A. OLSON  1,677,046
FLY SWATTER
Filed March 22, 1926
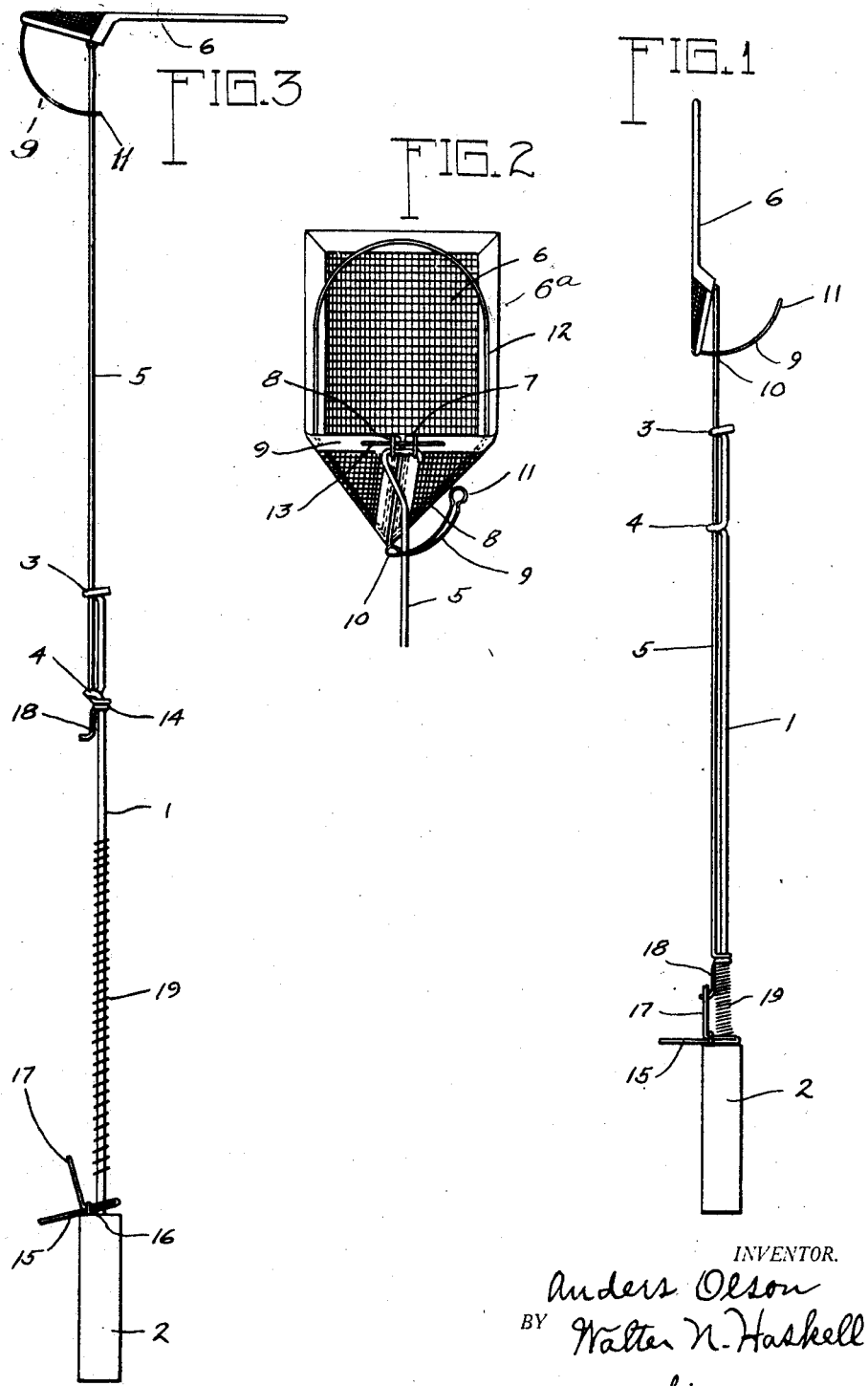
INVENTOR.
Anders Olson
BY Walter N. Haskell
his ATTORNEY.

Patented July 10, 1928.

1,677,046

UNITED STATES PATENT OFFICE.

ANDERS OLSON, OF GALESBURG, ILLINOIS.

FLY SWATTER.

Application filed March 22, 1926. Serial No. 96,464.

My invention has reference to fly swatters, and has for its purpose to combine the ordinary type of such devices, which are made use of in destroying flies and other insects which are within easy reach with an instrument for the extermination of such pests when they are more out of reach, as on the ceiling of a room. A common practice when they are so located is to climb upon a chair or other object and strike at the insects from that kind of a vantage point. This frequently proves to be ineffective, however, on account of the awkwardness of the position from which it is necessary to operate, and from the fact that the insect frequently changes its position. It is also more or less of a hazardous undertaking. With the present invention it is possible to reach an insect on a ceiling of ordinary height while the user of the instrument is standing on the floor.

In the drawings:—

Fig. 1 shows the invention in side elevation, as it appears when in its ordinary use.

Fig. 2 is an enlarged view of the swatter frame, detached.

Fig. 3 shows the device in position for use in reaching an insect at a little distance, with the instrument discharged.

The reference number 1 indicates a rod, fixed at one end in a handle 2, and provided at its opposite end with coils 3 and 4, in which is slidable a rod 5. On the outer end of the rod 5 is a swatter 6, hinged thereto by means of a bar 7 on the end of the rod 5, passing through staples 8 in the inwardly turned corners 9 of the swatter. The swatter 6 is formed of wire netting in the usual manner, and its edges are provided with a binding 6ª. The staples 8 are formed of wires, which are carried downwardly in the binding of the lower corner portions, and projected into a guide 9, provided at its ends with loops 10 and 11, adapted for releasable engagement with the rod 5. When the rod is held in the loop 10 the swatter 6 is held in extended position, in practical alignment with the rods 1 and 5, in which position it is used in the ordinary manner for killing flies, that face of the swatter opposite to the guide 9 being employed for that purpose. When the rod 5 is in the loop 11 the swatter is held in position at right angles with said rods, as shown in Fig. 3. The swatter 6 is reinforced by a wire frame 12, and the device is further strengthened by a wire 13, acting as a tie for the inturned lower corners.

On the lower end of the rod 5 is a coil 14, which is slidable on the rod 1, and the coils 3, 4, and 14 act as guides, permitting a telescopic action of said rods. Rockingly mounted on the inner end of the handle 2 is a trigger 15, having a bent portion held beneath a staple 16 in the end of the handle and perforated for the passage of the rod 1. The trigger 15 is also formed into an arm 17, having an aperture at its end for engagement with the outwardly bent end of a finger 18, projected downwardly from the loop 14. Interposed between the loop 14 and trigger 15 on the wire 1 is an extensile coiled spring 19, the tendency of which is to force the loop 14 and rod 5 outwardly. When the parts 17 and 18 are connected, as shown in Fig. 1, by forcing the projecting part of the trigger 15 outwardly the finger 18 is released, whereupon the spring 19 causes a quick action of the rod 5 outwardly, into the position shown in Fig. 3. This action is made use of in killing an insect at a point above the user, or at a little distance away. For use with an insect on a ceiling the swatter is held at a point immediately below the same, and the spring released, the swatter being impelled with considerable force, and over a distance of a foot or more.

It will be observed that in the use of the instrument just set forth it is possible to operate the same with one hand, the same as when the device is used in the customary manner. This makes it possible to position the instrument at a greater distance than if it were necessary to employ both hands in the operation thereof.

The spring 19 is not only effective in the discharge of the swatter, but when compressed it exerts a force against the trigger 15, holding the parts 17 and 18 from accidental release from each other.

What I claim, and desire to secure by Letters Patent, is:

A device of the class described, comprising a rod and handle therefor, an auxiliary rod having a telescopic connection with said first-named rod, a swatter hinged to the end of said auxiliary rod and means for holding the same in adjusted positions with reference to said rod, a trigger at the handle end of said first-named rod adapted for connection with said auxiliary rod, to hold said rods in fully telescoped relations, and a coiled spring on one of said rods, adapted to cause a sudden extension of said rods upon said trigger being released.

In testimony whereof I affix my signature.

ANDERS OLSON.